United States Patent [19]

Figueira, Jr.

[11] Patent Number: 5,660,099
[45] Date of Patent: Aug. 26, 1997

[54] BREAD BAKING TOOL

[76] Inventor: Ernest G. Figueira, Jr., 1808 Lynwood Dr., Concord, Calif. 94519-11126

[21] Appl. No.: 649,080

[22] Filed: May 17, 1996

[51] Int. Cl.$^6$ ............................................. A47J 45/00
[52] U.S. Cl. ............................ 99/337; 99/348; 294/26; 294/27.1
[58] Field of Search ........................ 99/337, 403, 404, 99/405, 407, 408, 409, 410, 411, 412, 413, 414, 415, 416, 417, 418, 348; 134/135; 68/197; 294/26, 27.1, 12

[56] References Cited

U.S. PATENT DOCUMENTS

| | | | |
|---|---|---|---|
| 97,054 | 11/1869 | Cottrell | 134/135 |
| 241,631 | 5/1881 | Duffy | 99/414 |
| 465,865 | 12/1891 | Kuhn | 294/12 |
| 896,133 | 8/1908 | Mayer | 294/12 X |
| 2,752,190 | 6/1956 | Baker | 294/26 |
| 4,471,985 | 9/1984 | Mahoney | 294/27.1 |

FOREIGN PATENT DOCUMENTS

| 74510 | 1/1949 | Germany | 294/26 |
|---|---|---|---|

*Primary Examiner*—Reginald Alexander
*Attorney, Agent, or Firm*—Bielen, Peterson & Lampe

[57] ABSTRACT

A tool for lifting a hot bread forming container from a bread baking apparatus. The tool includes a heat resistant element having a first end portion that engages the bail of the container. The second end portion extends upwardly through an intermediate portion to a handle which is formed of heat insulative material. The tool may be employed to manipulate the bail, and, thus, the bread container from the bread baking apparatus.

5 Claims, 1 Drawing Sheet

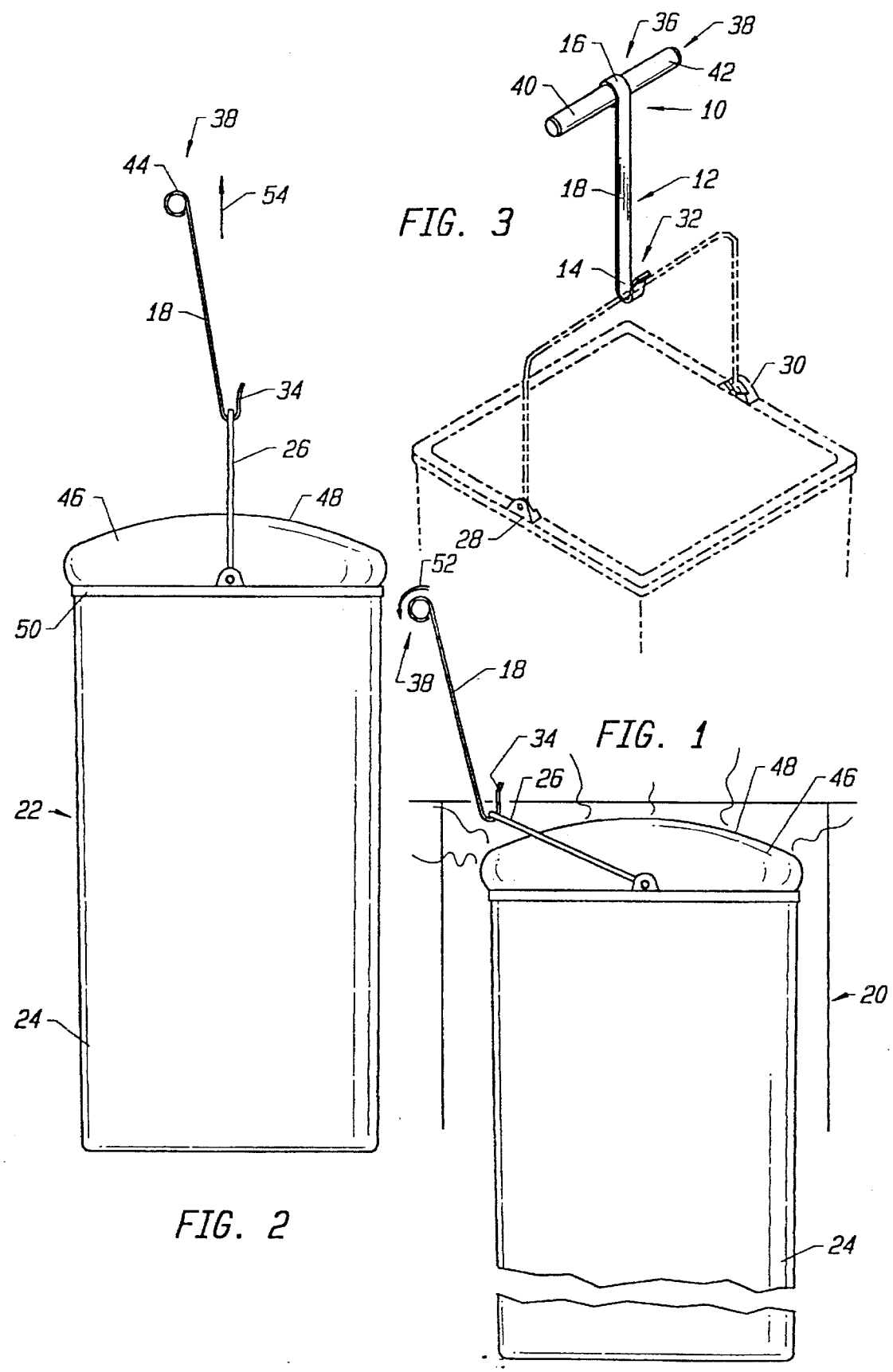

BREAD BAKING TOOL

BACKGROUND OF THE INVENTION

The present invention relates to a novel and useful tool for lifting or extracting a hot bread forming container from a bread baking apparatus.

Home bread baking machines have become common place in the recent past. Bread making ingredients are placed in an electrically operated bread baking apparatus, specifically, in a container or basket which is removable from a housing. The ingredients are permitted to rise under the influence of yeast, and are subsequently baked according to pre-determined temperatures and times.

After completion of the baking process, the user must grab the bail of the container holding the hot baked bread and lift it from the housing. Performing this task is often difficult to achieve and may burn the hands of the users. In the past, insulated pot holders or towels have been employed for this purpose. Unfortunately, these items increase the difficulty of grasping the bail and tend to damage the bread, which has risen above the upper surface of the container. Also, wooden tweezers have been employed to grasp the bail, but manipulation of such tweezers has proven difficult to achieve, since one leg of the tweezers must be slipped under the bail which again tends to damage the crust of the bread.

A tool which quickly and easily permits the user to lift the bail of a bread container used in a bread baking apparatus would be a remarkable advance in the food preparation field.

SUMMARY OF THE INVENTION

In accordance with the present invention a novel and useful tool for lifting a hot bread forming container possessing a bail from a bread baking apparatus is herein provided.

The tool of the present invention utilizes a heat resistant element, which may be heat conductive. For example, the element may be constructed of a metallic material, such as aluminum, which is strong and non-corrosive. Of course, other suitable heat resistant materials may be employed in this regard. The heat resistant element is formed with a first end portion, an opposite second end portion, and an intermediate portion connecting the first and second end portions. The first end portion includes a bail engaging member, which may be in the form of a hook. The second end portion of the heat resistant element is separated from the first end portion by the intermediate portion, which possesses a sufficient dimension to separate the first and second portions from the hot bread forming container. This is especially important when the tool is held by a bare-handed user and the hook of the heat resistant element engages the bail of the bread forming container.

A handle is also included in the present invention. The handle is constructed of heat insulative material such as wood, plastic, ceramic material, and the like. The second end portion of the heat resistant element includes means for linking the same to the handle. Such linking means may take the form of a loop formed in the heat resistant element. Of course, other linking means may be provided in this regard, such as fasteners, adhesives, and the like. In addition, the handle portion may be integrally formed or molded to the heat-resistant element. The handle includes at least one flange, preferably a pair of flanges, that extends outwardly from the linked heat resistant element. Where the heat resistant element is an elongated member, the bail engaging hook and the linking means loop may turn in opposite directions. This permits the hand of the user to grasp the handle of the tool of the present invention and avoid any heat conducted along the heat resistant element. The elongating member may be flattened to further dissipate any heat conducted from the bail of the bread forming container.

It may be apparent that a novel and useful tool for lifting a hot bread forming container from a bread baking apparatus has been described.

It is therefore an object of the present invention to provide a tool for lifting a hot bread forming container from a bread baking apparatus that is simple and easy to operate.

Another object of the present invention is to provide a tool for lifting a hot bread forming container from a bread baking apparatus which does not damage the bread formed by the container during moving of the container from the bread baking apparatus.

Yet another object of the present invention is to provide a tool for lifting a hot bread forming container from a bread baking apparatus which utilizes elements that do not possess moving parts.

Another object of the present invention is to provide a tool for lifting a hot bread forming container from a bread baking apparatus which is constructed to minimize the possibility of the user being burned by the heat generated during the bread baking process.

The invention possesses other objects and advantages especially as concerns particular characteristics and features thereof which will become apparent as the specification continues.

BRIEF DESCRIPTION OF THE DRAWINGS

FIG. 1 is a side elevational view of the tool of the present invention in engagement with the bail of a bread forming container within a bread baking apparatus.

FIG. 2 is a side elevational view of the tool of the present invention in which the bail of the bread forming container has been rotated upwardly by pulling motion on the tool.

FIG. 3 is a perspective view of the tool of the present invention in which the bread forming container is depicted in phantom.

For a better understanding of the invention reference is made to the following detailed description of the preferred embodiments thereof which should be taken in conjunction with the hereinabove described drawings.

DETAILED DESCRIPTION OF THE PREFERRED EMBODIMENTS

Various aspects of the present invention will evolve from the following detailed description of the preferred embodiments which should be referenced to the prior delineated drawings.

The invention as a whole is depicted in the drawings by reference character 10. Tool 10 includes a heat resistance element 12 having a first end portion 14, a second end portion 16, and an intermediate portion 18, which connects the first and second end portions 14 and 16, respectively. Element 12 may be formed of a material, such as aluminum, steel, and the like, which is not subject to melting or disintegration under heat generated by the bread baking apparatus 20 depicted schematically in FIG. 1. Heat resistant element 12 is shown as having a relatively large surface area, a flattened member to dissipate heat, which may be conducted from bread baking apparatus 20.

Apparatus 20 generally includes a bread forming container or basket 22 having a bucket portion 24 and a rotatable bail 26, FIG. 2. Bail 26 engages bored ears 28 and 30 of container 22 in this regard.

First end portion 14 of heat resistant element 12 possesses a bail engaging member 32 which may be in the form of a hook 34.

Second end portion 16 of heat resistant element 12 possesses means 36 for linking the heat resistant element 12 to a handle 38, FIG. 3. Handle 38 is formed of heat insulative material such as wood, plastic, ceramic material, and the like. Handle 38 includes flanges 40 and 42 which extend laterally and outwardly from means 36. Means 36 may take the form of a loop 44 which turns or curves oppositely to hook 34 and around handle 38.

In operation, the user operates bread baking apparatus 20 in the conventional manner to form a hot loaf of bread 46. When bread 46 has been baked, a crust 48 extends above the upper rim 50 of container 22. It is important that crust 48 not be punctured during the process of removing container 22 from apparatus 20. FIG. 1 represents illustrations of radiation lines that represent the escaping heat from apparatus 20 when bread 46 is ready for removal. Directional arrow 52 indicates the direction of the fingers of the user which wrap around flanges 40 and 42 of handle 38. Thus, intermediate portion 18 of heat resistant element 12 lies underneath handle 28 to a large extent, which essentially prevents the burning of the user's fingers to a large degree during the operation of tool 10. Hook 34 then engages with bail 26, FIG. 1 for rotation upwardly to the position shown in FIG. 3. Container 22 is then lifted from apparatus 20. Bread 46 is removed as desired from container 22. It has been found that tool 10 may be employed to remove container 22 from apparatus 20 when container 22 is hot, without damaging the crust 48 of bread 46 in the process.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A tool for lifting a hot bread forming container possessing a bail from a bread baking apparatus comprising:

a. a heat resistant element comprising an elongated member having a first end portion, a second end portion, and an intermediate portion connecting said first and second end portions, said first end portion including a bail engaging member comprising a hook, said intermediate portion possessing a sufficient dimension to separate said first end portion from the hot bread forming container when said engaging member engages the bail; and b. a handle, said handle being constructed of heat insulative material, said second end portion of said heat resistant element including means for linking said heat resistant element to said handle, said means for linking said heat resistant element to said handle including a loop at said second end portion of said heat resistant element, said loop partially encompassing said handle, said handle further including at least one flange extending outwardly from said linked heat resistant element.

2. The tool of claim 1 in which said hook turns in a direction opposite to a direction of turning of said loop.

3. The tool of claim 2 in which said handle possesses a pair of flanges extending outwardly from said means for linking said heat resistant element to said handle.

4. The tool of claim 1 in which said heat resistant element is constructed of heat conductive material.

5. The tool of claim 2 in which said elongated member is a flattened structure.

\* \* \* \* \*